(12) United States Patent
Kammermeier et al.

(10) Patent No.: US 7,665,937 B2
(45) Date of Patent: Feb. 23, 2010

(54) MILLING CUTTER

(75) Inventors: Dirk Kammermeier, Stein (DE); Peter Mergenthaler, Markt Bibart (DE)

(73) Assignee: Kennametal Inc., Latrobe, PA (US)

( * ) Notice: Subject to any disclaimer, the term of this patent is extended or adjusted under 35 U.S.C. 154(b) by 248 days.

(21) Appl. No.: 11/962,873

(22) Filed: Dec. 21, 2007

(65) Prior Publication Data

US 2008/0095589 A1 Apr. 24, 2008

Related U.S. Application Data

(62) Division of application No. 10/990,281, filed on Nov. 16, 2004, now Pat. No. 7,311,481.

(51) Int. Cl.
*B23C 5/06* (2006.01)

(52) U.S. Cl. .......................... 409/132; 409/137; 408/68; 82/901

(58) Field of Classification Search ................. 409/131, 409/132, 135–137; 408/56, 59, 67, 68; 144/252.1, 144/252.2; 82/901; 407/11, 53, 54; 29/DIG. 50
See application file for complete search history.

(56) References Cited

U.S. PATENT DOCUMENTS

| | | | |
|---|---|---|---|
| 1,530,654 A | 3/1925 | Daley | |
| 2,436,960 A * | 3/1948 | Fassnacht | 409/161 |
| 2,437,666 A | 3/1948 | Adams | |
| 2,437,668 A * | 3/1948 | Adams | 408/67 |
| 2,466,187 A * | 4/1949 | Tretheway | 409/139 |
| 2,497,738 A * | 2/1950 | Paul et al. | 241/30 |
| 3,140,321 A * | 7/1964 | Goepfert et al. | 260/665 G |
| 4,543,019 A | 9/1985 | Shikata | |
| 5,017,060 A | 5/1991 | Shiratori et al. | |
| 5,433,655 A | 7/1995 | Shiokawa et al. | |
| 5,451,122 A | 9/1995 | Noda et al. | |
| 5,451,126 A | 9/1995 | Brun | |
| 5,544,985 A | 8/1996 | Lane | |
| 5,558,475 A | 9/1996 | Hakansson et al. | |
| 5,620,285 A * | 4/1997 | Turchan | 409/132 |
| 5,645,382 A * | 7/1997 | Homanick et al. | 409/131 |
| 5,759,185 A | 6/1998 | Grinberg | |
| 5,803,683 A * | 9/1998 | Turchan | 409/277 |
| 6,382,886 B1 * | 5/2002 | Jaeger | 409/131 |

(Continued)

FOREIGN PATENT DOCUMENTS

DE 31 43 847 5/1983

(Continued)

*Primary Examiner*—Eric A Gates
(74) *Attorney, Agent, or Firm*—Larry R. Meenan

(57) ABSTRACT

Milling cutter (1), which can rotate about a cutter longitudinal axis (A), comprises a sleeve-shaped shaft (2) provided with an inner lying chip evacuation channel (11), which is arranged, in essence, symmetric to the cutter longitudinal axis (A), and with a suction opening (12). The milling cutter also comprises a milling head (3, 3a, 3b, 3c), which is held coaxial to the cutter longitudinal axis (A) and to the shaft (2) while being held on said shaft and which comprises, as cutting edges (7, 9), a face cutting edge (7) and a peripheral cutting edge (9). At least one cutting edge (7, 9) forms a positive rake angle ('Ya,'Yr) on the periphery of the milling head (3, 3a, 3b, 3c). The milling cutter (1) is particularly suited for machining light metals, especially for circular milling.

20 Claims, 11 Drawing Sheets

U.S. PATENT DOCUMENTS

| | | | |
|---|---|---|---|
| 6,470,552 B1 * | 10/2002 | Slemker et al. | 29/447 |
| 6,948,890 B2 | 9/2005 | Svensson et al. | |
| 7,509,897 B2 * | 3/2009 | Kammermeier et al. | 82/52 |
| 7,572,088 B2 * | 8/2009 | Biscay | 408/59 |
| 2004/0126194 A1 * | 7/2004 | Monsieur Fioroni | 408/68 |

FOREIGN PATENT DOCUMENTS

| | | |
|---|---|---|
| DE | 2 316762 | 10/1994 |
| DE | 195 12 401 | 4/1996 |
| DE | 44 39 114 | 5/1996 |
| JP | 52-8286 | 1/1977 |
| JP | 62-199339 | 9/1987 |
| JP | 3066509 | 3/1991 |
| JP | 3042761 | 10/1997 |
| JP | 11 138324 | 5/1999 |
| JP | 2001 170812 | 6/2001 |
| JP | 2002-166320 | 6/2002 |

\* cited by examiner

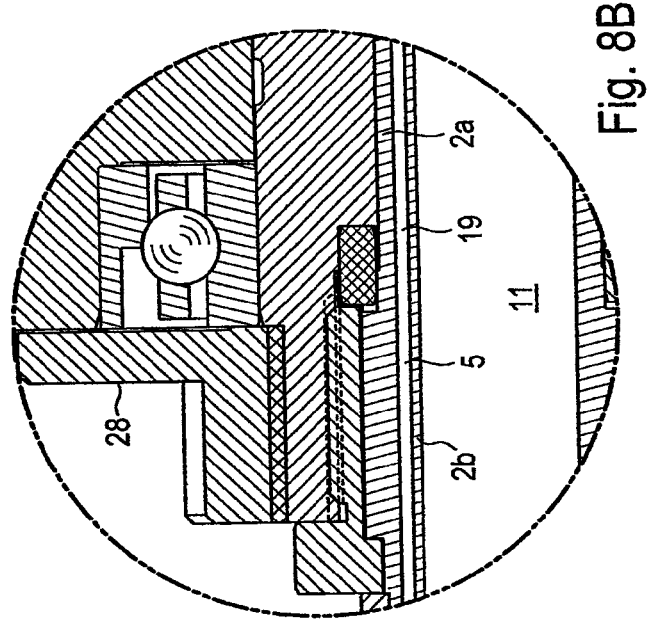
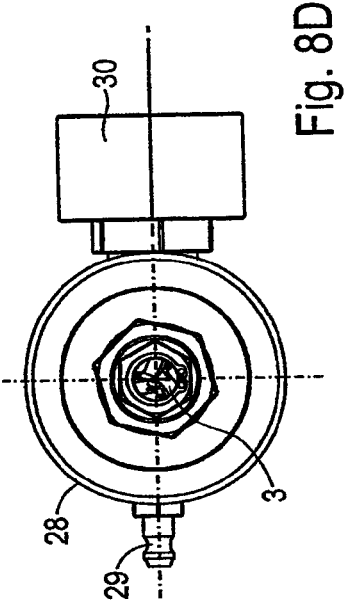
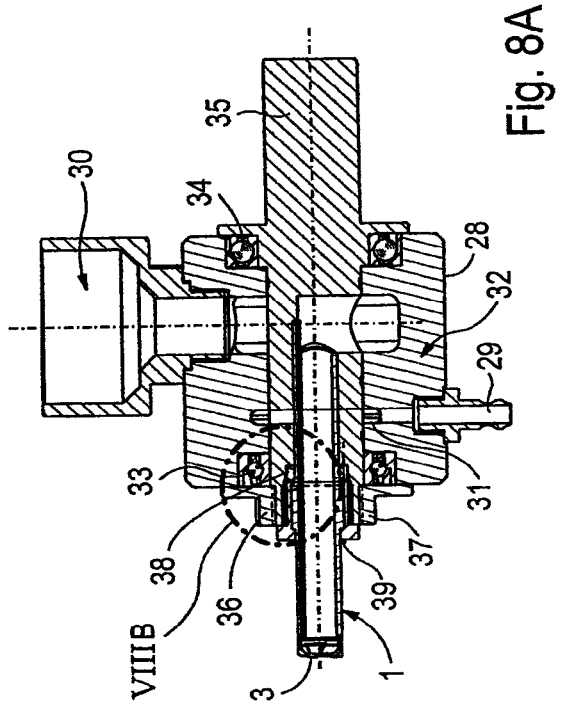
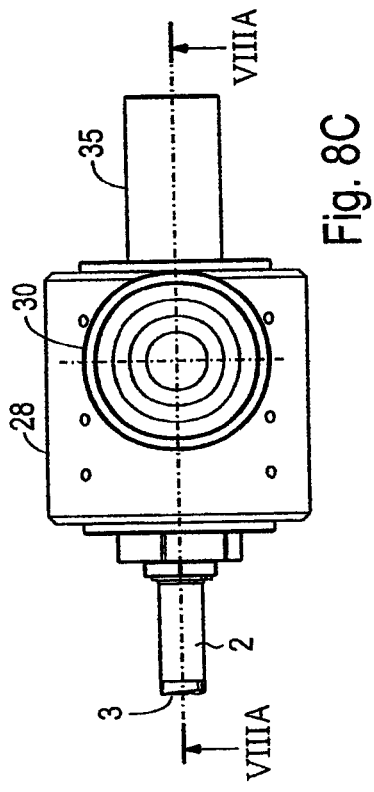
Fig. 8A
Fig. 8B
Fig. 8C
Fig. 8D

MILLING CUTTER

CONTINUING APPLICATION DATA

This application is a continuation of U.S. patent application Ser. No. 10/990,281, filed Nov. 16, 2004, which is a Continuation-In-Part application of International Patent Application No. PCT/EP03/05191, filed on May 16, 2003, which claims priority from Federal Republic of Germany Patent Application No. 102 22 040.9, filed on May 17, 2002. International Patent Application No. PCT/EP03/05191 was pending as of the filing date of U.S. patent application Ser. No. 10/990,281. The United States was an elected state in International Patent Application No. PCT/EP03/05191.

BACKGROUND

1. Technical Field

The present application relates to a milling cutter, in particular for machining light alloy metals, with a shaft and a milling head. The milling cutter can also have a sleeve-shaped shaft with an internal chip evacuation channel that is located essentially symmetrical to the longitudinal axis of the milling cutter and a suction aperture. The milling head is held so that it is coaxial to the longitudinal axis of the tool and to the shaft, with a face cutting edge and a peripheral cutting edge as cutting edges.

2. Background Information

Workpieces made of light alloy metals, such as magnesium alloys, for example, are frequently machined using metal removing processes. In this case, however, the formation of mixtures of magnesium dust and air is a problem. This problem occurs in particular during the dry cutting of light alloy metals. To address this problem, DE 44 39 114 A1, for example, discloses a very complex method and a device for dry, metal-removing machining, i.e. machining without a coolant feed, of a workpiece that is made of light alloy metal, whereby the cutting tool is located in a closed machining chamber in which a pressure gradient is set so that during the cutting process the machining chips are removed from the machining chamber. This chip removal device takes up a very large amount of space. The high cost and level of complexity of the apparatus results from the risk of explosion which is particularly great because of the formation of dry magnesium chips and dusts.

However, a risk of explosion during the metal-removing machining of light alloy metal cannot be prevented even by the use of coolants and lubricants. Aqueous emulsions cannot be used as cooling lubricants because magnesium would react chemically with the water during the machining operations. Therefore the cooling lubricants used must be oil-based. These cooling lubricants, however, have the disadvantage that the oil mist which is formed can be explosive, alone or in combination with light-alloy metal dust. An additional problem is the health hazard presented by the aerosols that are formed during machining. The cooling lubricant is also difficult and expensive to reprocess or dispose of after it has been used. Another problem, for example, is presented by the light alloy dust that is deposited on the machine tool or in the vicinity of the machine tool, which creates a risk of explosion not only immediately during the machining process but also when the dust is stirred up at some later time. Thus the specific problems related to the cutting of light alloy metals, in particular magnesium and magnesium alloys, cannot be eliminated even by the use of cooling lubricants.

OBJECT OR OBJECTS

The object is a device that makes possible a particularly efficient cutting of light alloy metals, in particular magnesium and magnesium alloys, and which is uncritical from a safety point of view.

SUMMARY

The present application teaches that this object can be accomplished by a milling cutter that has the characteristics according to at least one embodiment discussed herein. The milling cutter thereby has a sleeve-shaped shaft with an internal chip evacuation channel and a suction opening. Coaxial to the longitudinal axis of the tool and to the shaft and held on the shaft is a milling head which has at least one face cutting edge and at least one peripheral cutting edge. The cutting geometry of at least one of the cutting edges, possibly of both the peripheral cutting edge and of the face cutting edge, is positive or has a positive rake at least on the periphery of the milling head, i.e. the face cutting edge and/or the peripheral cutting edge forms a positive rake angle, possibly a rake angle of at least 10°. The rake angle of the face cutting edge is not necessarily constant over the entire length of the face cutting edge. To the extent that the peripheral cutting edge is adjacent to the face cutting edge, the rake angle of the face cutting edge on the periphery of the milling head also gives the angle of twist of the milling head, which is also called the side angle of rake. The positive cutting geometry in all cases guarantees a machining, with very positive angles of rake in the form of a progressive cut, with low cutting forces, as a result of which the tool is particularly well suited for the cutting of light alloys.

The chips that are formed during the machining of a workpiece are removed primarily and possibly exclusively through the chip evacuation channel located in the shaft, in particular symmetrical to the longitudinal axis of the cutter. The suction opening of the chip evacuation channel is possibly located on the end surface of the shaft, facing the milling head. On account of the removal of the chips by suction through the tool shaft, no machining chamber is required to suction away the chips.

The milling cutter is particularly appropriate for the dry cutting of light alloy metals such as magnesium and magnesium alloys. Because the milling head has at least one face cutting edge and at least one peripheral cutting edge, the milling cutter is very flexible, and can be used for circular milling, for example. Of course a tool with internal chip removal is known from DE 2 316 762 A, for example, although the tool described in the prior art document is not a milling cutter but a boring tool. This boring tool is intended primarily for the drilling of deep borings. The boring tool cannot be used for milling operations. That is particularly apparent from the fact that the boring tool has support strips located on the side that guide the boring tool in the boring. By contrast, the milling cutter claimed by the present application has a milling head that makes possible both a feed in the axial direction, i.e. in the direction of the longitudinal axis of the tool, as well as a feed perpendicular to the longitudinal axis of the tool.

The immediate removal by suction of the chips through the tool shaft prevents chips from being deposited on the processing machine. It also prevents thermal deformation of the workpiece and/or of the machine tool caused by contact with the hot chips. The chips can be at least almost entirely collected and recycled. The ability to do without the external vacuum removal of the chips that are formed during the machine means that the tool can be changed quickly and easily, as can the workpiece in the machine tool.

The milling head is possibly manufactured in one piece from a cutting material such as cemented carbide or hard metal. The milling head is thereby particularly stable and can also be used for smaller tool diameters, such as diameters less than 15 mm, for example. The milling head has no separate cutting inserts, e.g. of the type that have to be soldered in or screwed on. The fully one-piece configuration of the milling head made of a cutting material also comprises realizations in which individual volume or surface areas of the milling head, for example, in the form of a coating, have a composition or properties that differ from other parts of the milling head.

The diameter of the milling head is possibly greater than the diameter of the shaft, at least in the area of the shaft that is adjacent to the milling head.

It is thereby ensured that during both boring and milling operations, in particular during circular milling operations, the shaft of the milling cutter does not come into contact with the workpiece to be machined.

The milling head has a one-piece or multiple-piece aperture surface for the removal of the chips through the chip evacuation channel. To guarantee a reliable evacuation of the chips and to eliminate the risk of a jammed chip, the aperture surface of the milling head is possibly at least 35% and in particular at least 50% of the cross section surface of the shaft. The configuration of the milling head with correspondingly low material thicknesses is easy to realize, provided that the milling cutter is designed to be used exclusively for cutting light alloy metals.

The reliable evacuation of chips through the tool shaft is possibly facilitated by ensuring that the thickness of the milling head is a maximum of 50% of the diameter of the milling head. The chips are thereby conveyed over a very short distance from the tool into to the chip evacuation channel. The danger of a backup of chips in the milling head is therefore extraordinarily low.

In one preferred configuration, the milling head has at least three lobes or vanes with at least three face cutting edges and at least three peripheral cutting edges.

The forces during cutting are thereby distributed at least approximately symmetrically, in contrast to a single-lip borer. The configuration of the milling head with three or more lobes, in particular with five lobes, also has the advantage that, for example in comparison to a realization with only two face cutting edges, relatively short chips are formed, which can be easily evacuated through the internal chip evacuation channel. The smaller the chip, the larger its specific surface. A small chip can therefore be removed particularly efficiently by an air current in the chip evacuation channel. When a boring is being made by circular milling, shorter chips are formed than during boring, regardless of the shape of the milling head. The milling cutter is therefore particularly well suited for circular milling.

In an additional preferred configuration, the milling head is not completely rotationally symmetrical. Rather, the end surface or one of the end surfaces extends from the periphery of the milling head to beyond the longitudinal axis of the cutter, whereby the face cutting edges do not necessarily intersect the longitudinal axis of the cutter. It is thereby impossible for a core, such as a drill core, for example, to get stuck. The workpiece is machined in a defined manner over practically the entire cross section of the milling cutter, i.e. there is practically no displacement of material during the machining process. The milling cutter can thereby achieve a long useful life.

The face cutting edge of the milling head is adjacent, possibly on a corner cutting edge, is directly adjacent to the peripheral cutting edge. The corner cutting edge, which is located in the periphery of the milling head, makes it possible to produce exact contours on the workpiece. The corner cutting edge is thereby possibly the part of the milling head that is axially farthest from the shaft, with reference to the direction of the longitudinal axis of the cutter, i.e. the corner cutting edge is the farthest forward inside the milling cutter. If the milling cutter is used to create a depression in a workpiece, by circular milling, for example, this depression can be completely flat, because the corner cutting edge on the milling head is the farthest forward. One requirement for such an operation is that there must be sufficient lateral, i.e. radial freedom of movement during the milling. When the cutter is applied to the workpiece, only the corner cutting edge initially removes a chip from the workpiece. The cutting forces at the beginning of the cutting process are therefore very low.

Moreover, a particularly advantageous cutting geometry, in particular for the cutting of light alloy metals, can be achieved because the corner cutting edge is realized with an acute angle or sharp point. To achieve a particularly pronounced sharp-pointed shape of the corner cutting edge, at this point both the face cutting edge and the peripheral or radial cutting edges possibly each form a positive rake angle, namely an axial rake angle and/or a radial rake angle respectively. The angle which the peripheral cutting edge on the corner cutting edge bordering the cutting surface of the face cutting edge encloses with the longitudinal axis of the tool, at this point determines the axial rake angle, i.e. the rake angle of the face cutting edge. This angle, which forms a twist or spiral angle of the milling head, is possibly at least 10°, and in particular at least 30°. Simultaneously on the peripheral cutting edge, a radial rake angle on the corner cutting edge determined by the position of the face cutting edge is formed, which is possibly also at least 10° and in particular at least 15°. As a result of the high positive rake of both the axial and the radial cutting edges, i.e. of the face cutting edge and of the peripheral cutting edge, it is easy to execute both axial and radial feed movements.

The milling head is connected with the shaft possibly permanently, for example by soldering. A particularly stable connection can hereby be achieved, in particular when the shaft partly surrounds the milling head. For this purpose the milling head, for example approximately in the center of its vertical dimension, has a peripheral step which is in contact toward the shaft with a tapered area of the milling head. The portion of the milling head that projects beyond the shaft is available for the metal removing machining. To make maximum use of this part for the metal removal, the peripheral cutting edge possibly extends from the corner cutting edge to the peripheral step.

An increased stability of the shaft can be achieved by making it double-walled with an inner shaft and an outer shaft. As a result of this double-walled realization, it is possible in particular to utilize the space between the inner shaft and the outer shaft. The space in the shaft is possibly used for the feed of a fluid, in particular compressed gas, such as compressed air for example, while the inner shaft forms the wall of the chip evacuation channel. The evacuation of the chips can be assisted by the feed of compressed air through a fluid feed aperture provided for the purpose, which is possibly located on the side of the outer shaft. In addition or alternatively to the compressed air, a cooling lubricant can also be fed through the fluid feed aperture. The fluid channel formed between the inner shaft and the outer shaft possibly has a helical shape.

This shape has the advantage that the fluid, e.g. cooling lubricant, conducted to the milling head and the machining point on the end of the shaft, has a tangential flow component in addition to the axial flow direction, and thus immediately removes the chips generated to the chip evacuation channel. The spraying of cooling lubricant at the milling head can thereby be configured in the manner of a water jet pump. The helical fluid channel also makes it possible to locate appropriately helical support elements between the inner shaft and the outer shaft and thus to further increase the stability of the shaft.

The chip evacuation channel should be generously sized in relation to the diameter of the milling cutter to guarantee the smooth removal of the chips. The diameter of the chip evacuation channel is possibly at least 75% of the shaft diameter. In the case of a double-walled shaft, the inside inner shaft diameter which defines the diameter of the chip evacuation channel is at least 75% of the outside diameter of the outer shaft, which is the same as the shaft diameter. The wall thicknesses of the outer shaft and of the inner shaft are thereby possibly each a maximum of 10% of the shaft diameter. Because at least the majority of the cutting and chucking forces are absorbed by the outer shaft, the wall thickness of the outer shaft possibly exceeds the wall thickness of the inner shaft.

The particular advantage is that as a result of an internal chip evacuation channel in a milling cutter, which has a milling head that has at least one face cutting edge and at least one peripheral cutting edge, it becomes possible to perform a very efficient machining with an axial and/or radial feed, in particular the circular milling of a workpiece, in particular one made of light alloy metal such as magnesium for example.

In at least one possible embodiment, the milling cutter may also be used for cutting or machining or milling other light metals, such as light metal alloys, aluminum, titanium, beryllium alloys, and non-ferrous metals or metal alloys.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

One exemplary embodiment is explained in greater detail below and is illustrated in the accompanying figures, in which:

FIGS. 8A to 8D show a milling cutter and a chucking and feed device.

DESCRIPTION OF EMBODIMENT OR EMBODIMENTS

Identical or equivalent parts are identified by the same reference numbers in all the figures.

Figure 1A:
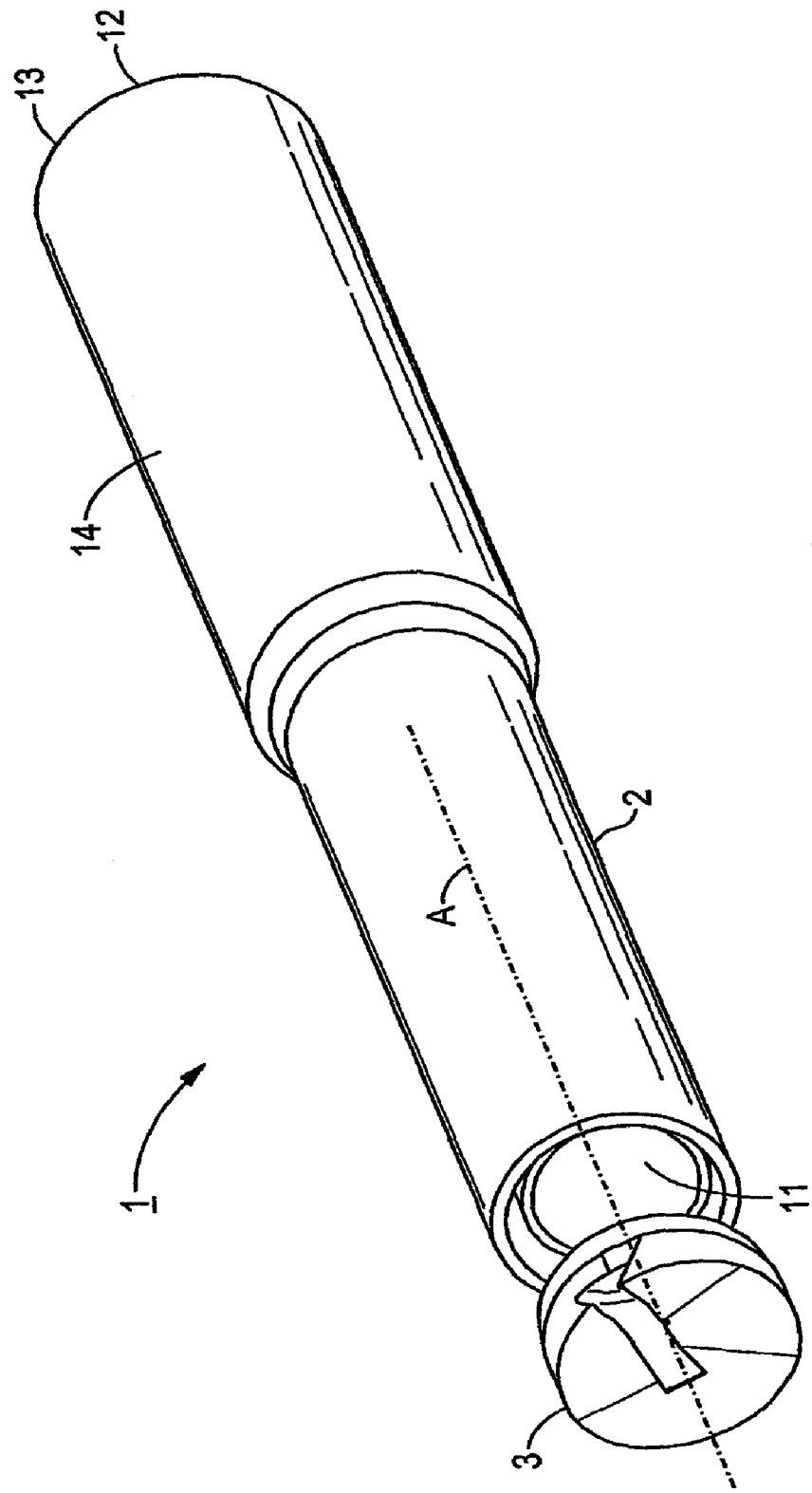
FIGS. 1A, 1B, and 1C show in perspective a milling cutter with an internal chip evacuation channel.
Figure 1B:
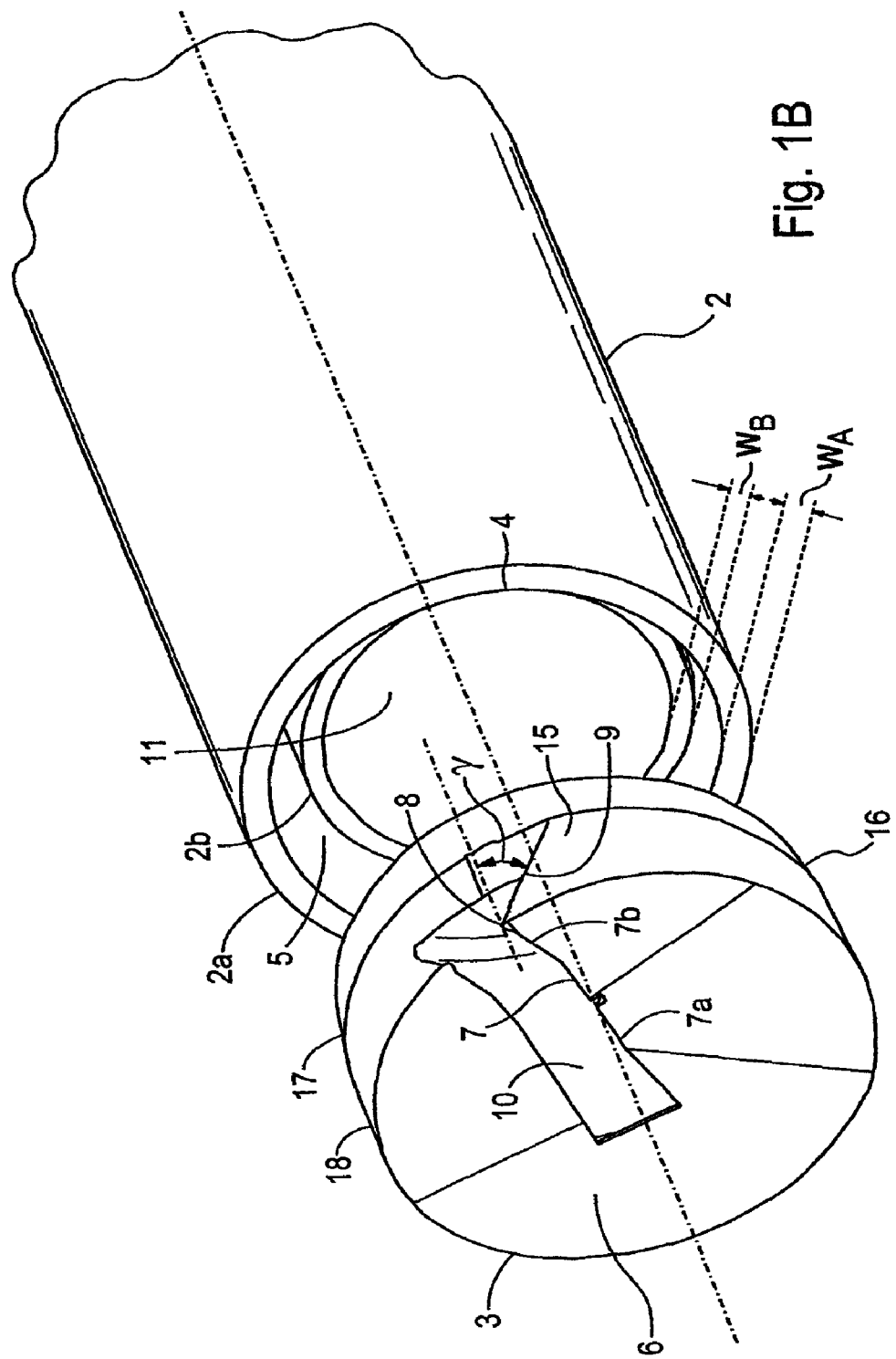
Figure 2B:
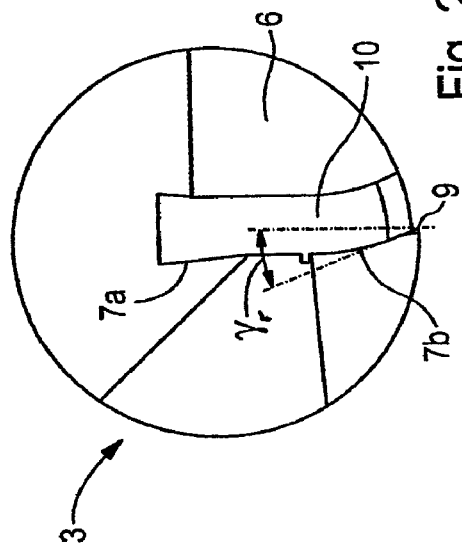
FIGS. 2A to 2C show various views of the milling head of the milling cutter illustrated in FIGS. 1A-1C.
Figure 2C:
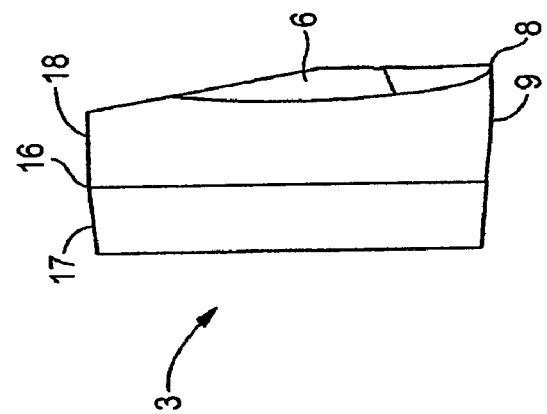
Figure 2A:
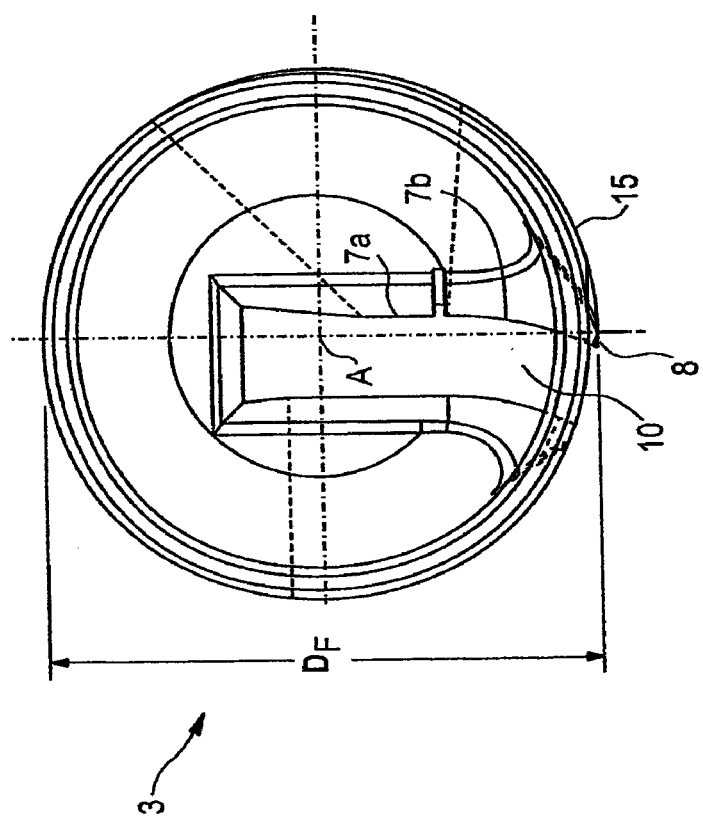
Figure 3A:
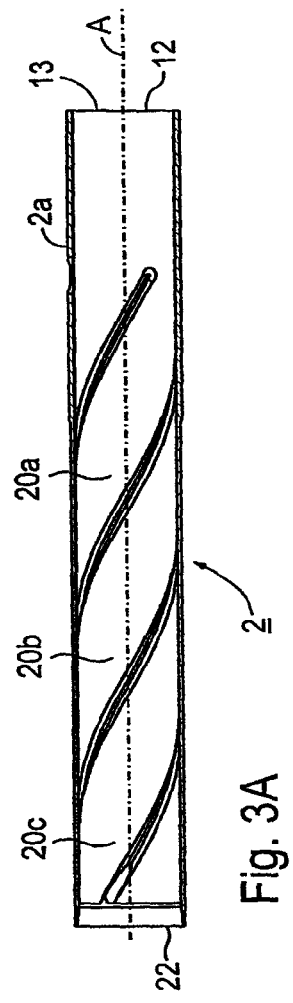
FIGS. 3A to 3E show a shaft of a milling cutter with an internal chip evacuation channel.
Figure 3B:
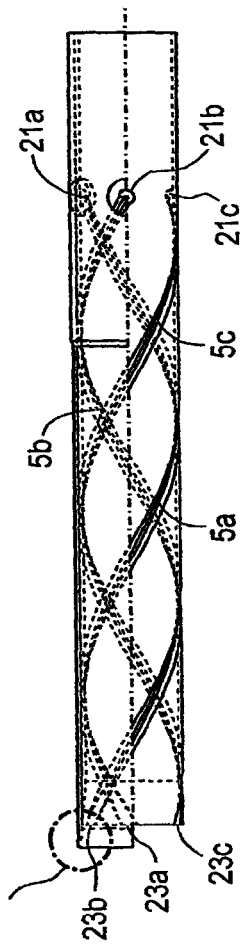
Figure 3C:
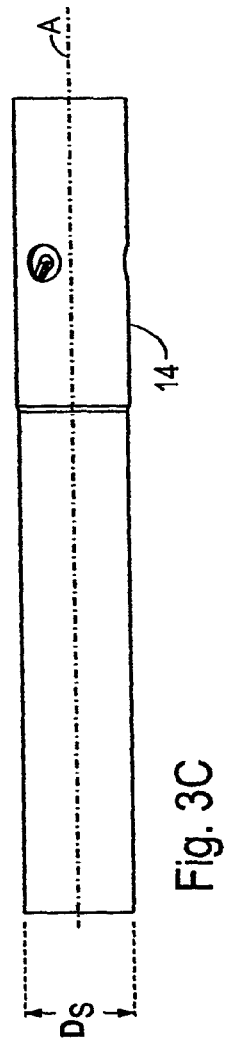
Figure 3E:
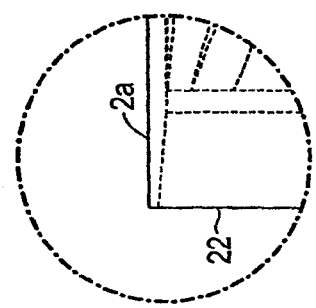
Figure 3D:
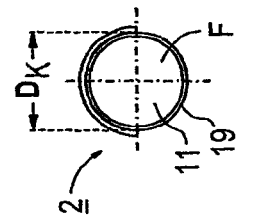
Figure 4C:
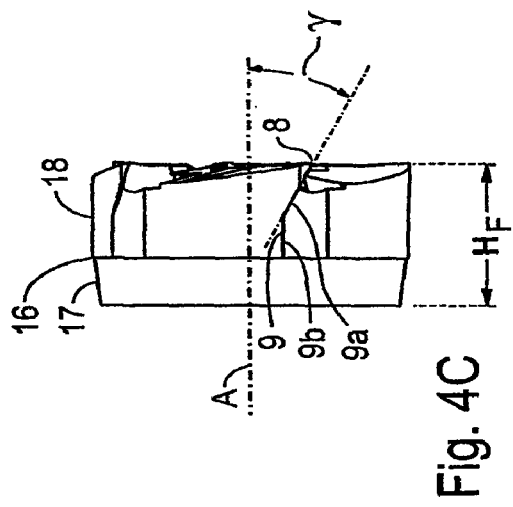
FIGS. 4A to 4E show a five-lobed head for a milling cutter with an internal chip evacuation channel.
Figure 4E:
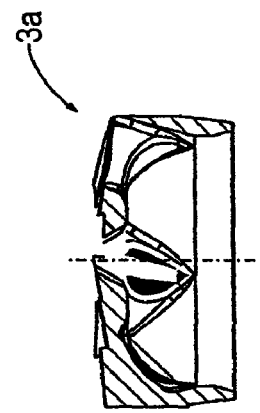
Figure 4B:
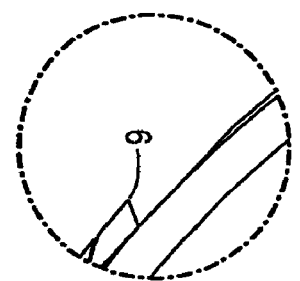
Figure 4A:
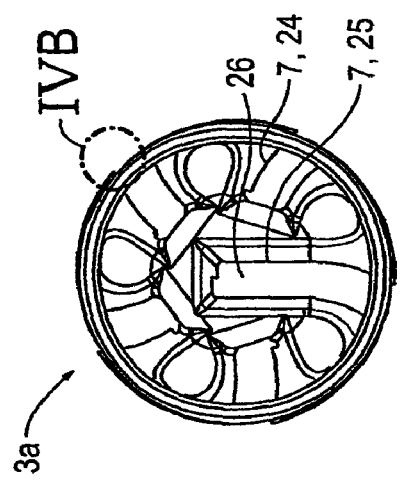
Figure 4D:
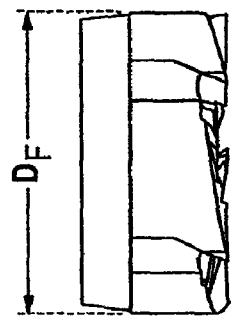
Figure 5A:
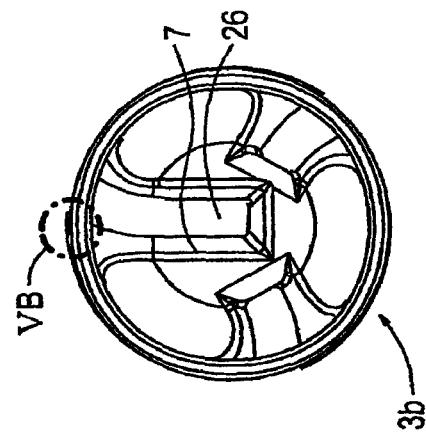
FIGS. 5A to 5E show a three-lobed head for a milling cutter with an internal chip evacuation channel.
Figure 5B:
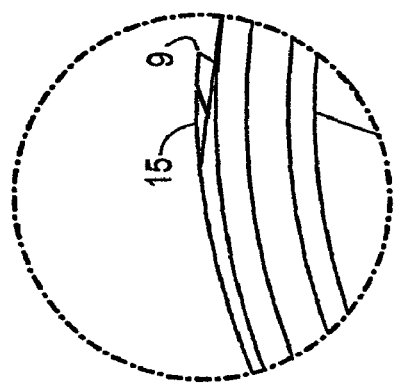
Figure 5D:
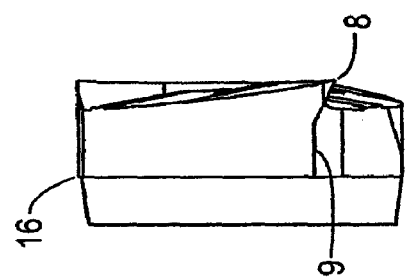
Figure 5E:
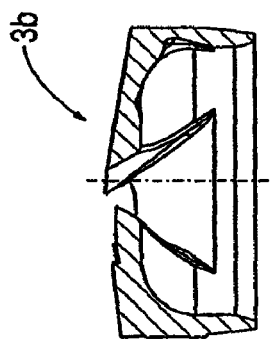
Figure 5C:
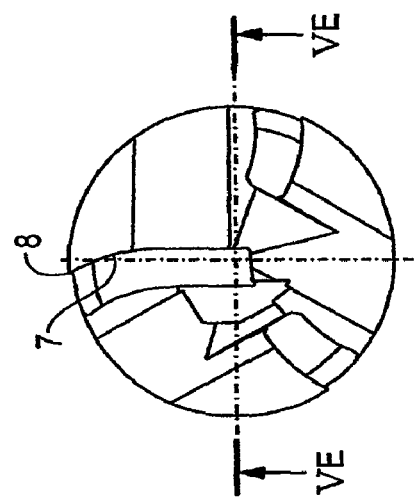

FIGS. 1A and 1B show views in perspective, overall and individual sections, of a milling cutter 1 with a shaft 2 and an essentially disc-shaped milling head 3. FIGS. 2A to 2C show various views of the milling head 3 by itself. Specifically, FIG. 2A shows the milling head 3 from below, i.e. in a view from the shaft 2. FIG. 2B shows the milling head 3 from above, and FIG. 3C shows a side view of the milling head 3. The shaft 2 of the milling cutter 1 is double-walled with an outer shaft 2a and an inner shaft 2b. The milling head 3 is shown removed from the shaft 2, to make the details of this realization clearer in FIGS. 1A and 1B.

Figure 7:
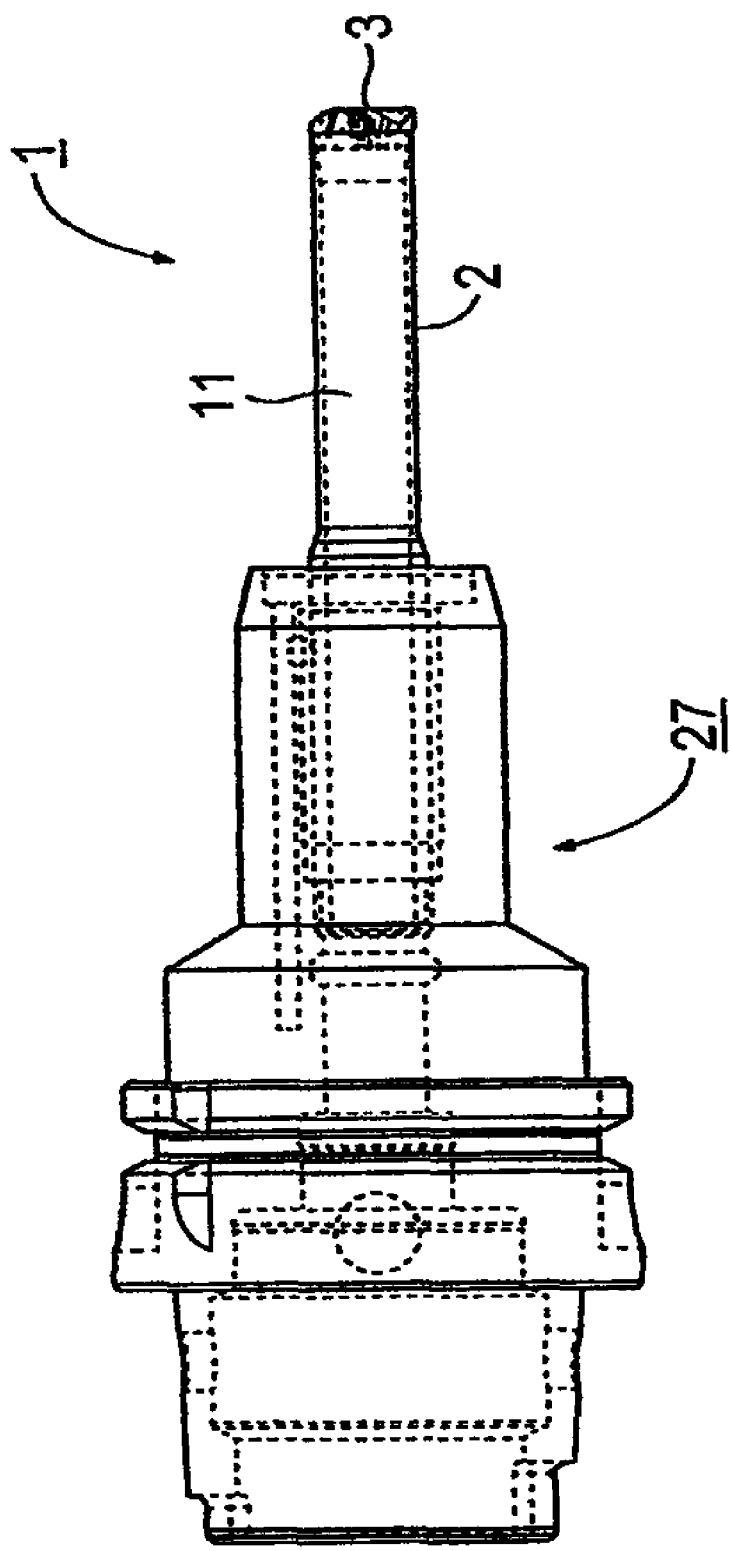
FIG. 7 shows a hydraulic expansion chuck with a chucked milling cutter.

The inner shaft 2b is located eccentrically in relation to the outer shaft 2a, so that the inner shaft 2a is in contact, on its periphery, against the outer shaft 4 in a contact area 4 that extends parallel to the axis A of the milling cutter 1 along the shaft 2. The inner shaft 2b is permanently connected with the outer shaft 2a at the contact area 4, for example by soldering. Opposite the contact area 4 in the shaft 2, between the inner shaft 2b and the outer shaft 2a, there is a fluid channel 5 with an approximately crescent-shaped cross section. A fluid such as compressed air and/or cooling lubricant can be fed through the fluid channel 5 to the milling head 3. The milling head 3 has, on its end surface 6, a face cutting edge 7 and adjacent to the end surface a peripheral cutting edge 9. A chip that is formed at the cutting edges 7, 9, in particular a light alloy chip, enters through a space 10 into a chip evacuation channel 11 surrounded by the inner shaft 2b and can be evacuated through a suction opening 12 which is located on the shaft end 13 in a thicker region 14 of the shaft 2. The thicker, mechanically particular stable area 14 is used to absorb the chucking forces that are exerted on the milling cutter 1 in the expansion chuck (27) (FIG. 7) or in the housing with vertical evacuation.

The face cutting edge 7 has a radial cutting edge 7a and adjacent to it, a relatively shorter and partly curved a beveled cutting edge 7b that is adjacent to the corner cutting edge 8. Overall, the face cutting surface 7 extends from one edge 15 of the milling head 3 essentially radially to beyond the tool axis A. At the corner cutting edge 8, the peripheral cutting edge 9 encloses an angle of twist γ which in this exemplary is constant and is approximately 45°, which corresponds to an axial angle or rake $\gamma_a$ of the face cutting edge 7 (See FIG. 6G). Simultaneously, the peripheral cutting edge 9, as shown in particular in FIGS. 2A and 2B, has a radial angle of rake $\gamma_r$ of approximately 15 to 20°, which is determined on the face end 6 of the milling head 3 by the position of the face cutting edge 7 and is not necessarily constant over the entire length of the peripheral cutting edge 9. On the corner cutting edge 8 there is thus a highly positive cutting geometry as a result of the diagonal position of the cutting edges or cutting segments 9, 7b.

In at least one possible embodiment, the cutting edge 7b lies substantially in a plane substantially perpendicular to the longitudinal axis A of the milling cutter 1. What is meant by the preceding phrase "lies substantially in a plane substantially perpendicular to the longitudinal axis A" is that the cutting edge 7b may lie in the perpendicular plane, or may deviate from lying in the perpendicular plane to another position to define an angle with respect to the perpendicular plane, such as around 10°. This angle may be in a range of substantially 0° to an angle somewhat greater than 10°. This angle, for purposes of disclosure, may vary in typically one degree increments over this range. Therefore, the cutting edge 7b lies substantially in a plane substantially perpendicular to the longitudinal axis A, such that an angle in a range of substantially 0° to an angle somewhat greater than 10° is defined by the cutting edge 7b and the perpendicular plane.

On account of this cutting geometry, the milling cutter 1 is particularly well suited for cutting light alloy metals, in particular for high-speed machining operations.

The milling head 3, as shown in particular in FIG. 2C, has a peripheral step 16, by which a tapered area 17 is delimited from a forward area 18 that contains the cutting edges 7, 9. In this tapered area 17, the milling head 3 can be connected with the outer shaft 2a by soldering, welding or adhesive. The diameter $D_S$ of the shaft in its area adjacent to the milling head 3 is somewhat smaller than the diameter $D_F$ of the milling head 3, which is specified as twice the maximum distance of the peripheral cutting edge 9 from the longitudinal axis of the tool.

Figure 1C:
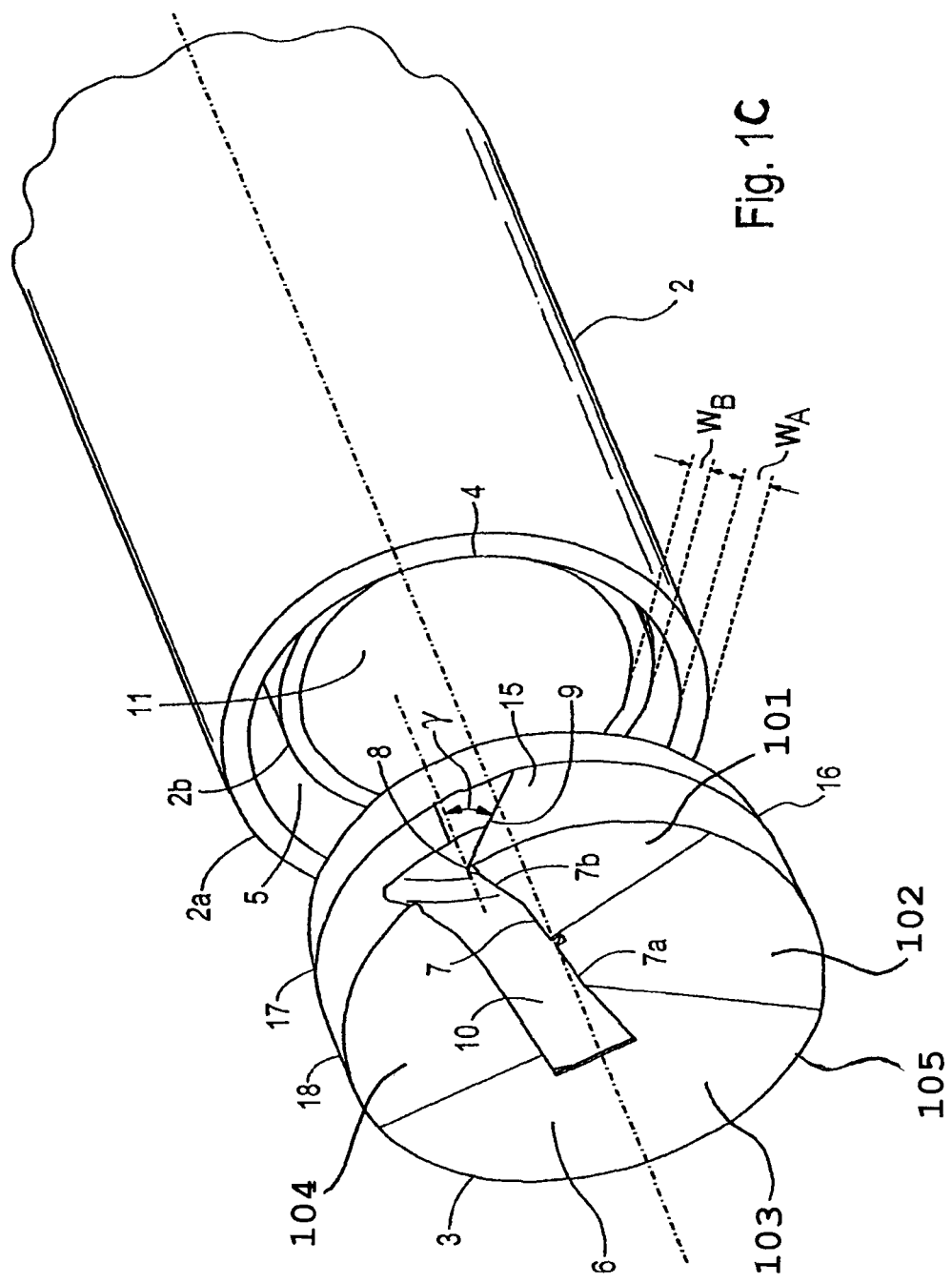

FIG. 1C is the same view as FIG. 1B, with additional detail, specifically surfaces 101, 102, 103, and 104 of the end surface 6 of the milling head 3. These surfaces 101, 102, 103, 104, in at least one possible embodiment, could be substantially flat or could have a curvature. In at least one embodiment, surface 101, as seen in FIG. 1C, extends in a downward slope from the cutting edge 7b to the peripheral edge 105 of the milling head 3 such that the cutting edge 7b is located further away from the shank 2 of the milling cutter 1 in the axially direction than any point on the surface 101 and the peripheral edge 105 of the milling head 3. In one other possible embodiment, cutting edge 7b and the surface 101 or a portion thereof could lie substantially in a plane that is substantially perpendicular to the longitudinal axis A. Surface 102 could be similarly disposed with respect to cutting edge 7a as surface 101 is to cutting edge 7b. In at least one embodiment, surfaces 101 and 102, or at least a portion thereof, are located further away from the shank 2 of the milling cutter 1 in the axially direction than surfaces 103 and 104, or at least a portion thereof. In another possible embodiment, cutting edges 7a and 7b are located further away from the shank 2 of the milling cutter 1 in the axially direction than surfaces 103 and 104. In at least one possible embodiment, the surfaces 101, 102, 103, 104 could be individual surfaces disposed at angles with respect to another, or could be configured as a substantially contiguous surface with a substantially smooth, constant surface. Additional various configurations of the surfaces of the end face 6 of the milling head 3 not specifically set forth herein are to be understood as being within the scope of the present application.

FIGS. 3A to 3E show various view of a shaft 2 which is realized in the form of a milling cutter 1, for example with a milling head 3 as illustrated in FIGS. 2A to 2C. The shaft 2 is realized with a double wall whereby the wall thickness $W_A$ of the outer shaft 2a is greater than the wall thickness $W_B$ of the inner shaft 2b (see FIGS. 1A and B). The inner shaft 2b in this exemplary embodiment (FIGS. 3A-E) is located symmetrically in the outer shaft 2a, which in its rear area which is provided to hold it in a machine tool and which comprises the thicker area 14, can have a variety of different profiles. Inside the annular space 19 that is formed between the inner shaft 2b and the outer shaft 2a, there are three separate helical fluid channels 5a, b, c. Between the individual fluid channels 5a, b, c, also in the annular space 19, there are likewise helical webs 20a, b, c. Each fluid channel 5a, b, c has a respective fluid entrance aperture 21a, b, c on the shaft 2 and a respective fluid discharge opening 23a, b, c on the forward end 22 of the shaft 2 provided to hold the milling head 3. The fluid channels 5a, b, c are particularly well suited to feed cooing lubricant to the milling head 3 in the form of the delivery of a minimum amount of lubricant. For the feed of the fluid under pressure, a small cross section of the fluid channels 5a, b, c in comparison to the total cross section of the shaft 2 is sufficient. The largest part of the cross section surface F of the shaft 2 is available for the evacuation of the chips. The term "cross section surface F" as used here means the cross section surface of the shaft 2 that the shaft has on its forward end 22, immediately adjacent to the milling head 3. The diameter $D_K$ of the chip evacuation channel 11, which is defined by the inside diameter of the inner shaft 2b, is more than 90% of the shaft diameter $D_S$, which is defined by the outside diameter of the outer shaft 2a in the area of its forward end 22. In this manner, a high mass flow of chips and gas, in particular air, optionally mixed with cooling lubricant, can flow through the chip evacuation channel 11.

FIGS. 4A-E, 5A-E and 6A-E show various realizations of milling heads 3a, 3b, 3c, which are manufactured in one or more pieces from a cutting material, in particular cemented carbide, hard metal, cermet or ceramic, in particular with PKD [polycrystalline diamond] and CBN [polycrystalline cubical boron nitride], and can be connected with a shaft 2 as illustrated in FIGS. 3A-E with a milling cutter 1, in particular by soldering. The milling heads 3a, 3b, 3c are suitable for different types of milling work, in particular for circular milling. In circular milling, the milling cutter 1 rotates around the longitudinal axis A of the tool and simultaneously the axis A rotates around an additional axis which is parallel to its own axis. In this manner, it is possible to create a boring, the diameter of which is greater than the diameter $D_F$ of the milling head 3a, 3b, 3c. Therefore a multiplicity of borings with different diameters can be made with a comparatively small number of milling cutters 1. The circular milling has the advantage over the creation of a boring with a boring tool that during the metal removal, only short chips are formed, which can be easily removed from the site of the machining.

The milling head 3a illustrated in FIG. 4A-E has five lobes or five cutting edges with five face cutting edges 7 and five peripheral cutting edges 9. Four of the five face cutting edges 7 are realized in the form of short cutting edges, while one of the face cutting edges 7 is realized in the form of a long cutting edge 25, which in contrast to the short cutting edges 24 extends from the edge 15 of the milling head 3a beyond the longitudinal axis of the tool or the short axis A. The peripheral cutting edges 9 in the illustrated exemplary embodiment have a notched shape with, adjacent to the corner cutting edge 8, a forward cutting area 9a which encloses the peripheral cutting edge angle α of approximately 30° with the longitudinal axis A of the cutter, and with a rear cutting area 9b which runs parallel to the longitudinal axis A of the tool. The fact that the forward cutting area 9a is oriented at an angle with respect to the longitudinal axis A of the tool achieves a particular positive cutting geometry, in particular on the corner cutting edge 8. As a result, in particular for the machining of light alloys, metal removing operations can be carried out with a high surface quality on the machined workpiece and with low cutting forces. The effect achieved with the diagonal positioning of the forward cutting area 9a of the peripheral cutting edge 9 is comparable to the effect achieved with the diagonal positioning of the corner cutting edge 7b of the face cutting edge 7, whereby both effects can be realized simultaneously on a milling head 3, 3a so that they reinforce each other.

The milling head 3a, in a plan view (FIG. 4A, view from above), has a five-part aperture area 26 which corresponds to the number of face cutting edges, through which area the chips formed can be removed to the chip evacuation channel 11. The size of the aperture surface 26 varies along the axis A of the milling cutter 1, although in all cases it equals at least 35% of the cross section surface F of the shaft 2. The height $H_F$ of the milling head is less than 50% of the diameter $D_F$ of the milling head. Chips formed are thereby introduced into the chip evacuation channel 11 after traveling only a very short distance. The tapered area 17 of the milling head 3a has a slightly conical configuration, to facilitate the insertion of the milling head 3a into the appropriately shaped shaft 2 (FIG. 3A-E).

Figure 6A:
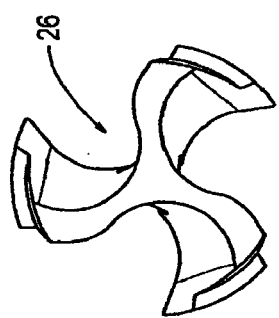
FIGS. 6A to 6H an alternative realization of a three-lobed milling head.
Figure 6B:
Figure 6D:
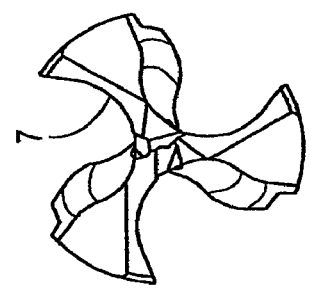
Figure 6E:
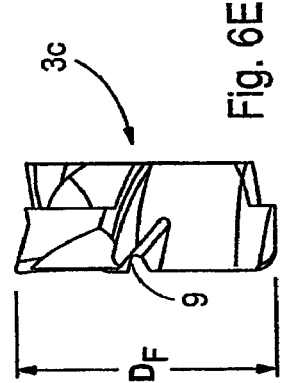
Figure 6C:
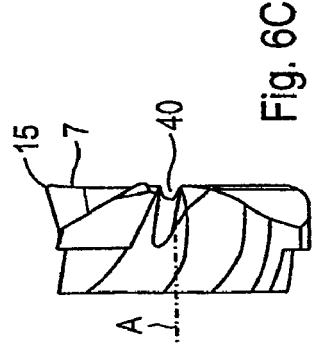
Figure 6H:
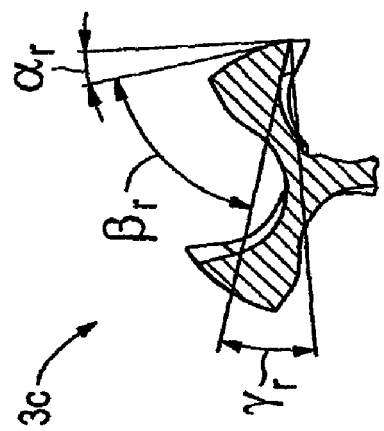
Figure 6G:
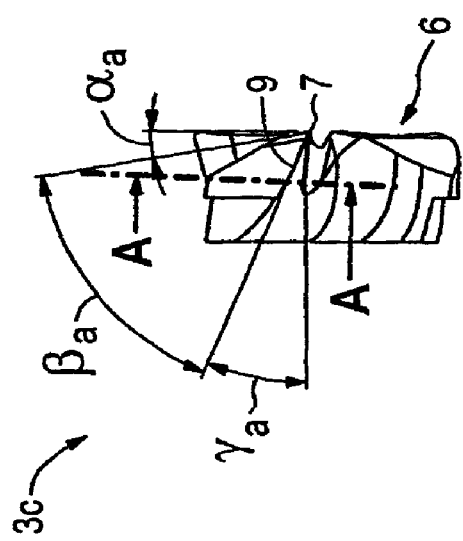
Figure 6F:
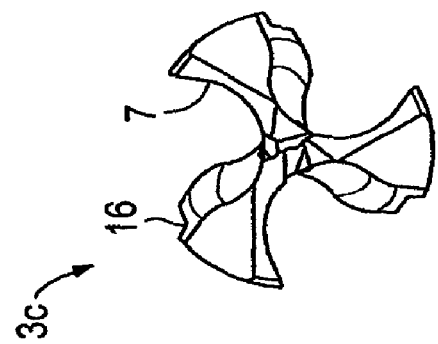

The milling head 3b illustrated in FIGS. 5A-5E is realized with three lobes and otherwise corresponds to the milling head 3a illustrated in FIGS. 4A-4E. The milling head 3c illustrated in FIGS. 6A-6H is an additional realization of a three-lobed milling head with a particularly large aperture area 26. The milling head 3c has a depression 40 in the area of the axis A, on its end surface 6. The peripheral step 16 is particularly pronounced in the milling head 3c. In particular, the side view in FIG. 6C shows that the face cutting edges 7 fall off to some extend from the edge 15 of the milling head 3c toward the axis A, i.e. the face cutting edges 7 at the respective corner cutting edge 8 are at the maximum axial distance from the shaft 2. The angles formed at the cutting edges 7, 9, namely the axial clearance angle $\alpha_a$, the axial cutting wedge angle $\beta_a$, and the axial rank angle $\gamma_a$ on the face cutting edge 7, as well as the radial clearance angle $\alpha_r$, the radial cutting wedge angle $\beta_r$ and the radial rake angle $\gamma_r$ on the peripheral cutting edge 9 are shown in FIGS. 6G and 6H. From this configuration, it follows that the axial rake angle $\gamma_a$ is greater than the radial rake angle $\gamma_r$, which makes possible a particularly easy removal of chips in the axial direction.

FIG. 7 and FIGS. 8A-8D show a milling cutter 1 which is chucked in a hydraulic expansion chuck 27 or in a chucking and feeding device 28. In the illustrated exemplary embodiment, the milling cutter 1 can be chucked in the chucking and feeding device 28 without a hydraulic chucking mechanism, although the integration of such a hydraulic chucking mechanism is also possible. The chucking and supply device 28 makes possible both a feed of fluids to the fluid channels 5a, b, c as well as a sucking of chips and optionally fluid from the suction opening 12. For this purpose the chucking and feed device 28 has a fluid feed pipe 29 and a suction funnel 30, which can be connected to removal or disposal devices which are not shown in the drawings.

Compressed air and/or cooling lubricant can be fed through the fluid feed pipe 29 to the milling cutter 1 by means of a coolant ring 31. Alternatively, separate fluid feed pipes 29 can also be provided for the compressed air feed on one hand and the cooling lubricant feed on the other hand. In all cases, the mass flow fed through the fluid feed pipe 29 to the milling cutter 1—not taking the mass of the chips into consideration—is approximately equal to the mass current evacuated via the suction funnel 30, to which an underpressure can be applied, from the suction opening 12. In this manner, it can be ensured that the chips are removed in their entirety and immediately after their formation through the internal chip evacuation channel 11.

The chucking and feed device 28 has a bearing housing 32 in which, by means of a forward ball bearing 33 and a rear ball bearing 34, a base receptacle 35 which holds the shaft 2 concentrically, is mounted so that it can rotate. The essentially rotationally symmetrical base receptacle 35 has a multiplicity of openings to make it possible to feed compressed air and/or cooling lubricant and to remove the chips to and from the milling cutter respectively. On the front side of the bearing housing 32 facing the milling head 3, to chuck and secure the base receptacle 35 and the shaft 2 in position, there are an internal retaining nut 36, an external retaining nut 37, two drive pins 38 and a circlip 39.

One feature or aspect of an embodiment is believed at the time of the filing of this patent application to possibly reside broadly in a milling cutter which can be rotated around a tool longitudinal axis, with a sleeve-shaped shaft with an internal chip evacuation channel that is located essentially symmetrical to the longitudinal axis of the tool and a suction aperture, a milling head held so that it is coaxial to the longitudinal axis of the tool and to the shaft on the shaft, with an face cutting edge and a peripheral cutting edge as cutting edges, whereby at least one cutting edge on the periphery of the milling head forms a positive rake angle.

Another feature or aspect of an embodiment is believed at the time of the filing of this patent application to possibly reside broadly in a milling cutter, characterized by the fact that the rake angle on the periphery of the milling head is at least 10°.

Yet another feature or aspect of an embodiment is believed at the time of the filing of this patent application to possibly reside broadly in a milling cutter, characterized by the fact that both the rake angle of the face cutting edge and the rake angle of the peripheral cutting edge on the periphery of the milling head is at least 10°.

Still another feature or aspect of an embodiment is believed at the time of the filing of this patent application to possibly reside broadly in a milling cutter, characterized by the fact that the milling head is formed in one piece from a cutting material.

A further feature or aspect of an embodiment is believed at the time of the filing of this patent application to possibly reside broadly in a milling cutter, characterized by the fact that the diameter of the shaft is smaller than the diameter of the milling head at least in an area that borders the milling head.

Another feature or aspect of an embodiment is believed at the time of the filing of this patent application to possibly reside broadly in a milling cutter, characterized by the fact that the milling head has an aperture surface for the removal of chips into the chip evacuation channel, which amounts to at least 35% of the cross section surface of the shaft.

Yet another feature or aspect of an embodiment is believed at the time of the filing of this patent application to possibly reside broadly in a milling cutter, characterized by the fact that the height of the milling head is a maximum of 50% of the diameter of the milling head.

Still another feature or aspect of an embodiment is believed at the time of the filing of this patent application to possibly reside broadly in a milling cutter, characterized by the fact that the milling head is realized with at least three lobes.

A further feature or aspect of an embodiment is believed at the time of the filing of this patent application to possibly reside broadly in a milling cutter, characterized by the fact that the face cutting edge extends from one edge of the milling head to beyond the longitudinal axis of the tool.

Another feature or aspect of an embodiment is believed at the time of the filing of this patent application to possibly reside broadly in a milling cutter, characterized by the fact that the peripheral cutting edge is adjacent to a corner cutting edge on the face cutting edge.

Yet another feature or aspect of an embodiment is believed at the time of the filing of this patent application to possibly reside broadly in a milling cutter, characterized by the fact that the corner cutting edge, with reference to the direction of the longitudinal axis of the tool, is the part of the milling head that is axially the farthest from the shaft.

Still another feature or aspect of an embodiment is believed at the time of the filing of this patent application to possibly reside broadly in a milling cutter, characterized by the fact that the peripheral cutting edge encloses an angle of twist ($\gamma$) of at least 10° with the longitudinal axis of the tool.

A further feature or aspect of an embodiment is believed at the time of the filing of this patent application to possibly reside broadly in a milling cutter, characterized by the fact that the milling head has a peripheral step, adjacent to which in the direction toward the shaft is a tapered area of the milling head.

Another feature or aspect of an embodiment is believed at the time of the filing of this patent application to possibly reside broadly in a milling cutter, characterized by the fact that the peripheral cutting edge is adjacent to the peripheral step.

Yet another feature or aspect of an embodiment is believed at the time of the filing of this patent application to possibly reside broadly in a milling cutter, characterized by the fact that the shaft is realized with a double wall, with an inner shaft and an outer shaft.

Still another feature or aspect of an embodiment is believed at the time of the filing of this patent application to possibly reside broadly in a milling cutter, characterized by a fluid feed opening located laterally on the outer shaft.

A further feature or aspect of an embodiment is believed at the time of the filing of this patent application to possibly reside broadly in a milling cutter, characterized by a helical fluid channel between the inner shaft and the outer shaft.

Another feature or aspect of an embodiment is believed at the time of the filing of this patent application to possibly reside broadly in a milling cutter, characterized by the fact that the diameter of the chip evacuation channel is at least 75% of the shaft diameter.

Yet another feature or aspect of an embodiment is believed at the time of the filing of this patent application to possibly reside broadly in a milling cutter, characterized by the fact that the wall thickness of the outer shaft is a maximum of 10% of the shaft diameter.

Still another feature or aspect of an embodiment is believed at the time of the filing of this patent application to possibly reside broadly in a milling cutter, characterized by the fact that the wall thickness of the inner shaft is a maximum of 10% of the shaft diameter.

A further feature or aspect of an embodiment is believed at the time of the filing of this patent application to possibly reside broadly in a milling cutter, characterized by the fact that the wall thickness of the inner shaft is less than the wall thickness of the outer shaft.

Another feature or aspect of an embodiment is believed at the time of the filing of this patent application to possibly reside broadly in a milling cutter which can be rotated around a tool longitudinal axis, with a sleeve-shaped shaft with an internal chip evacuation channel that is located essentially symmetrical to the longitudinal axis of the tool and a suction aperture, a milling head held so that it is coaxial to the longitudinal axis of the tool and to the shaft on the shaft, with an face cutting edge and a peripheral cutting edge as cutting edges, whereby at least one cutting edge on the periphery of the milling head forms a positive rake angle, characterized by the fact that the shaft is realized with a double wall, with an inner shaft and an outer shaft.

Yet another feature or aspect of an embodiment is believed at the time of the filing of this patent application to possibly reside broadly in a milling cutter, characterized by the fact that the rake angle on the periphery of the milling head is at least 10°.

Still another feature or aspect of an embodiment is believed at the time of the filing of this patent application to possibly reside broadly in a milling cutter, characterized by the fact that both the rake angle of the face cutting edge and the rake angle of the peripheral cutting edge on the periphery of the milling head is at least 10°.

A further feature or aspect of an embodiment is believed at the time of the filing of this patent application to possibly reside broadly in a milling cutter, characterized by the fact that the peripheral cutting edge encloses an angle of twist of at least 10° with the longitudinal axis of the tool.

Another feature or aspect of an embodiment is believed at the time of the filing of this patent application to possibly reside broadly in an end milling cutter configured to mill light metals, said end milling cutter having a central longitudinal axis about which said end milling cutter is to be rotated, said end milling cutter comprising: a sleeve-shaped shaft being disposed coaxially with respect to said central longitudinal axis; an internal channel disposed in said shaft; said internal channel being configured to receive and guide light metal chips produced during a cutting process; a suction device being operatively connected to said internal channel; said suction device being configured and disposed to create a suction force in said internal channel to suck light metal chips produced during a light metal cutting process through said internal channel; a milling head being connected to an end of said shaft and being disposed coaxially with respect to said central longitudinal axis; said milling head comprising: an end face disposed at an end of said end milling cutter and facing away from said shaft; a peripheral side surface disposed about the perimeter of said milling head; a cutting structure being configured to cut a light metal object in a cutting process; and said cutting structure comprising: a face cutting edge being disposed to lie in said end face of said milling head; a peripheral cutting edge being disposed to lie in said peripheral side surface of said milling head; and at least one of said cutting edges forms a positive rake angle ($\gamma_a$, $\gamma_r$).

Yet another feature or aspect of an embodiment is believed at the time of the filing of this patent application to possibly reside broadly in a method of milling a light metal, such as magnesium, with an end milling cutter configured to mill light metals, said end milling cutter having a central longitudinal axis about which said end milling cutter is to be rotated, said end milling cutter comprising: a sleeve-shaped shaft being disposed coaxially with respect to said central longitudinal axis; an internal channel disposed in said shaft; said internal channel being configured to receive and guide light metal chips produced during a cutting process; a suction device being operatively connected to said internal channel; said suction device being configured and disposed to create a suction force in said internal channel to suck light metal chips produced during a light metal cutting process through said internal channel; a milling head being connected to an end of said shaft and being disposed coaxially with respect to said central longitudinal axis; said milling head comprising: an end face disposed at an end of said end milling cutter and facing away from said shaft; a peripheral side surface disposed about the perimeter of said milling head; a cutting structure being configured to cut a light metal object in a cutting process; and said cutting structure comprising: a face cutting edge being disposed to lie in said end face of said milling head; a peripheral cutting edge being disposed to lie in said peripheral side surface of said milling head; and at least one of said cutting edges forms a positive rake angle ($\gamma_a$, $\gamma_r$) said method comprising the steps of: cutting a light metal, such as magnesium, with said cutting edges of said end milling cutter; sucking chips into said internal channel with said sucking device to essentially prevent combustion of light metal chips, such as magnesium; and essentially preventing combustion of light metal chips, such as magnesium.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Some examples of reamers that may be utilized or adapted for use in at least one possible embodiment of the present invention may be found in the following U.S. Pat. Nos. 6,202,768 B1, issued to Lindgren et al. on Mar. 20, 2001; 6,112,835, issued to Grafe et al. on Sep. 5, 2000; 6,076,618, issued to Åsberg on Jun. 20, 2000; 5,551,812, issued to Basteck on Sep. 3, 1996; 5,499,896, issued to Cafarelli on Mar. 19, 1996; 5,354,155, issued to Adams on Oct. 11, 1994; 5,328,304, issued to Kress et al. on Jul. 12, 1994; 5,238,335, issued to Nomura on Aug. 24, 1993; 5,217,333, issued to Hunt on Jun. 8, 1993; 5,190,113, issued to Hawrylak on Mar. 2, 1993; 5,163,790, issued to Vig on Nov. 17, 1992; 5,149,233, issued to Kress et al. on Sep. 22, 1992; 4,936,721, issued to Meyer on Jun. 26, 1990; 4,795,289, issued to Potemkin on Jan. 3, 1989; 4,792,264, issued to Kress et al. on Dec. 20, 1988; 4,705,435, issued to Christoffel on Nov. 10, 1987; 4,480,704, issued to May et al. on Nov. 6, 1984; 4,452,307, issued to Horton on Jun. 5, 1984; 4,350,204, issued to Horton on Sep. 21, 1982; 4,182,425, issued to Garrett on Jan. 8, 1980; 4,040,765, issued to Vig on Aug. 9, 1977; and 4,014,622, issued to Lotz on Mar. 29, 1977.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

Some examples of milling cutters that may be utilized or adapted for use in at least one possible embodiment of the present invention may be found in the following U.S. Pat. Nos. 6,231,281 B1, issued to Nishikawa on May 15, 2001; 6,220,795 B1, issued to Matthews on Apr. 24, 2001; 6,217,262 B1, issued to Wright on Apr. 17, 2001; 6,176,648 B1, issued to Mizutani on Jan. 23, 2001; 6,158,927, issued to Cole et al. on Dec. 12, 2000; 6,146,059, issued to Rohr on Nov. 14, 2000; 6,109,838, issued to Rivière on Aug. 29, 2000; 6,042,308, issued to Schmitt on Mar. 28, 2000; 5,967,706, issued to Hughes, Jr. on Oct. 19, 1999; 5,957,628, issued to Bentjens et al. on Sep. 28, 1999; 5,934,842, issued to Gupta on Aug. 10, 1999; 5,919,008, issued to Shimomura on Jul. 6, 1999; 5,899,642, issued to Berglow et al. on May 4, 1999; 5,868,529, issued to Rothballer et al. on Feb. 9, 1999; 5,848,858, issued to Jager et al. on Dec. 15, 1998; 5,820,308, issued to Hoefler on Oct. 13, 1998; 5,762,452, issued to Mina on Jun. 9, 1998; 5,672,031, issued to Oles on Sep. 30, 1997; 5,542,795, issued to Mitchell on Aug. 6, 1996; 5,542,794, issued to Smith et al. on Aug. 6, 1996; 5,529,439, issued to Werner et al. on Jun. 25, 1996; 4,990,035, issued to Scheuch et al. on Feb. 5, 1991; 4,938,638, issued to Hessman et al. on Jul. 3, 1990; 4,930,949, issued to Giessler on Jun. 5, 1990; 4,848,978, issued to Keritsis on Jul. 18, 1989; 4,799,838, issued to Kubo et al. on Jan. 24, 1989; 4,789,273, issued to Wiacek et al. on Dec. 6, 1988; 4,729,697, issued to Lacey on Mar. 8, 1988; 4,728,228, issued to Okunishi et al. on Mar. 1, 1988; 4,627,771, issued to Kieninger on Dec. 9, 1986; 4,623,284, issued to Greiff on Nov. 18, 1986; 4,533,282, issued to Lindlar et al. on Aug. 6, 1985; 4,519,731, issued to Jester et al. on May 28, 1985; 4,493,594, issued to Okada on Jan. 15, 1985; 4,461,602, issued to Zettl on Jul. 24, 1984; 4,359,299, issued to Sagarian on Nov. 16, 1982; 4,204,787, issued to McCray et al. on May 27, 1980; 4,097,174, issued to Heinlein on Jun. 27, 1978; 4,093,392, issued to Hopkins on Jun. 6, 1978; 4,061,076, issued to Robertson on Dec. 6, 1977; 4,050,129, issued to Jester et al. on Sep. 27, 1977; and 4,050,128, issued to Lange on Sep. 27, 1977.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the patents, patent applications or patent publications, which were cited in the International Search Report dated Sep. 26, 2003, and/or cited elsewhere are hereby incorporated by reference as if set forth in their entirety herein as follows: U.S. Pat. No. 5,759,185; U.S. Pat. No. 2,437,668; JP 2002166320; JP 62199339; DE 3143847; U.S. Pat. No. 5,433,655; DE 19512401; and U.S. Pat. No. 4,543,019.

The corresponding foreign and international patent publication applications, namely, Federal Republic of Germany Patent Application No. 102 22 040.9, filed on May 17, 2002, having inventors Dirk KAMMERMEIER and Peter MERGENTHALER, and DE-OS 102 22 040.9 and DE-PS 102 22 040.9, and International Application No. PCT/EP03/05191, filed on May 16, 2003, having WIPO Publication No. WO 03/097283 A1 and inventors Dirk KAMMERMEIER and Peter MERGENTHALER, as well as their published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

A description of what is meant by a "positive rake angle" may possibly be found in a printed excerpt, specifically chapter 2, of "Cutting Tool Applications" by George Schneider, Jr. CmfgE, which excerpt was published in the February, 2001 issue of "Tooling and Production" magazine, which is a publication of Tooling and Production, located at 6001 Cochran Rd., Suite 104, Solon, Ohio 44139, and Nelson Publishing, Inc., located at 2500 Tamiami Trail North, Nokomis, Fla. 34275. The above published excerpt is incorporated by reference as if set forth in its entirety herein.

The abstract of the disclosure is submitted herewith as required by 37 C.F.R. §1.72(b). As stated in 37 C.F.R. §1.72 (b):

A brief abstract of the technical disclosure in the specification must commence on a separate sheet, possibly following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

Some examples of milling cutters, such as the WIDIA M680 Series, manufactured by Kennametal Inc., 1600 Technology Way, Latrobe, Pa., 15650, and components thereof that may be utilized or adapted for use in at least one possible embodiment of the present invention may be found in the following publications: "WIDIA" product catalog, published in 2003; "Universal End Milling—Mill 1 NGE-A Universal Face Milling—KSOM" product catalog 3053; and "High-Performance Milling Cutters for High-Temp Alloys and Stainless Steels" product catalog 2052; all published by Kennametal Inc., and/or by at least one of the divisions or subsidiaries thereof. These publications are incorporated by reference as if set forth in their entirety herein.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

| At Least Partial Nomenclature: | |
|---|---|
| 1 | Milling cutter |
| 2 | Shank |
| 2a | Outer shank |
| 2b | Inner shank |
| 3a, b, c | Milling head |
| 4 | Contact area |
| 5a,b,c | Fluid channel |
| 6 | Face side |
| 7 | Face cutting edge, |
| 7a | Radial cutting edge |
| 7b | Beveled cutting edge |
| 8 | Corner cutting edge |
| 9 | Peripheral cutting edge |
| 9a | Forward cutting area |
| 9b | Rear cutting area |

-continued

At Least Partial Nomenclature:

| | |
|---|---|
| 10 | Gap |
| 11 | Chip evacuation channel |
| 12 | Suction aperture |
| 13 | Shaft end |
| 14 | Thicker portion |
| 15 | Periphery |
| 16 | Peripheral step |
| 17 | Tapered area |
| 18 | Forward area |
| 19 | Annular space |
| 20a,b,c | Web |
| 21a,b,c | Fluid entrance aperture |
| 22 | Forward end |
| 23a,b,c | Fluid exit aperture |
| 24 | Short cutting edge |
| 25 | Long cutting edge |
| 26 | Aperture surface |
| 27 | Hydraulic expansion chuck |
| 28 | Chucking and feed device |
| 29 | Fluid feed pipes |
| 30 | Suction funnel |
| 31 | Coolant ring |
| 32 | Bearing casing |
| 33 | Ball bearing |
| 34 | Ball bearing |
| 35 | Base receptacle |
| 36 | Retaining nut |
| 37 | Retaining nut |
| 38 | Driving pin |
| 39 | Circlip |
| 40 | Depression |

Symbols $\gamma$ Angle of twist
$\alpha_a$ Axial clearance angle
$\beta_a$ Axial cutting wedge angle
$\gamma_a$ Axial rake angle
$\alpha_r$ Radial clearance angle
$\beta_r$ Radial cutting wedge angle
$\gamma_r$ Radial rake angle
A Longitudinal axis of tool
$D_K$ Diameter of chip evacuation channel
$D_S$ Diameter of shaft
D Diameter of milling head
F Cross section surface
$H_F$ Height of milling head
$W_A$ Wall thickness
$W_B$ Wall thickness

What is claimed is:

1. A method of milling a magnesium workpiece with an end milling cutter comprising a central longitudinal axis about which said end milling cutter is to be rotated, said end milling cutter comprising: a rotatable shaft comprising an internal channel disposed in said shaft; said internal channel being configured to receive and guide chips produced during a cutting process; said internal channel being configured to be operatively connected to a suction device configured to create a suction force in said internal channel to suck chips produced during a cutting process through said internal channel; a milling head being disposed at an end of said shaft and being connected to said shaft to be driven and rotated by said shaft in a cutting operation, wherein said rotatable shaft comprises an inner diameter, said milling head comprises an outer diameter, and the inner diameter of said rotatable shaft is smaller than the outer diameter of said milling head, at least in an area that borders said milling head; and said milling head comprising: an end face being disposed at an end of said end milling cutter and facing away from said shaft; said end face being substantially orthogonal to the longitudinal axis; said end face comprising a substantially flat solid portion being disposed substantially in a plane; a peripheral side surface disposed about the perimeter of said milling head; a cutting structure being configured to cut an object in a cutting process; and said cutting structure comprising: a face cutting edge being disposed to lie in said end face and substantially in the plane of said end face of said milling head; a peripheral cutting edge being disposed to lie in said peripheral side surface of said milling head; at least one of said cutting edges being configured to form a positive rake angle; upon said face cutting edge forming a positive rake angle, said face cutting edge being configured as follows: (a) said face cutting edge and said peripheral side surface forming an angle, across a solid portion of said end face between said face cutting edge and said peripheral side surface, at the intersection of said face cutting edge and said peripheral side surface; said face cutting edge angle comprising an acute angle configured to form a positive rake angle; upon said peripheral cutting edge forming a positive rake angle said peripheral cutting edge being configured as follows: (b) said peripheral cutting edge and said end face forming an angle, across a solid portion of said peripheral side surface between said peripheral cutting edge and said end face, at the intersection of said peripheral cutting edge and said end face; and said peripheral cutting edge angle comprising an acute angle configured to form a positive rake angle; said method comprising the steps of: rotating said rotatable shaft and driving and rotating said milling head; creating a suction force in said internal channel using a suction device operatively connected to said internal channel; bringing said milling head into contact with the magnesium workpiece; cutting the magnesium workpiece with said cutting edges of said end milling cutter and producing magnesium chips; and sucking the magnesium chips into and through said internal channel in said shaft and conducting the magnesium chips away from the magnesium workpiece to essentially prevent combustion of the magnesium chips; and essentially preventing combustion of the magnesium chips.

2. The method according to claim 1, wherein:
both the rake angle of said face cutting edge and the rake angle of said peripheral cutting edge are configured to form positive rake angles; and
at least one of the rake angle of said face cutting edge and the rake angle of said peripheral cutting edge is at least 10°.

3. The method according to claim 2, wherein: said milling head is formed in one piece from a cutting material; said milling head has an aperture surface for the removal of chips into said internal channel configured to receive and guide chips, which amounts to at least 35% of the cross section surface of said shaft; and said step of sucking magnesium chips into and through said internal channel in said shaft comprises sucking magnesium chips through said aperture surface and into said internal channel.

4. The method according to claim 3, wherein:
the height of said milling head is a maximum of 50% of the diameter of said milling head;
said milling head is realized with at least three lobes; and
said face cutting edge extends from one edge of said milling head to beyond the longitudinal axis of said end milling cutter.

5. The method according to claim 4, wherein said milling cutter comprises at least one of (a) through (f), as follows:
(a) said shaft is realized with a double wall, with an inner shaft and an outer shaft;

said milling cutter comprises a fluid feed opening located laterally on said outer shaft;

(b) said shaft is realized with a double wall, with an inner shaft and an outer shaft;

said milling cutter comprises a helical fluid channel between said inner shaft and said outer shaft;

(c) said internal channel configured to receive and guide chips comprises a diameter;

the diameter of said internal channel configured to receive and guide chips is at least 75% of said shaft diameter;

(d) said shaft is realized with a double wall, with an inner shaft and an outer shaft;

the wall thickness of said outer shaft is a maximum of 10% of said shaft diameter;

(e) said shaft is realized with a double wall, with an inner shaft and an outer shaft;

the wall thickness of the inner shaft is a maximum of 10% of the shaft diameter; and (f) said shaft is realized with a double wall, with an inner shaft and an outer shaft;

the wall thickness of said inner shaft is less than the wall thickness of said outer shaft.

6. The method according to claim 5, wherein:

said peripheral cutting edge is adjacent to a corner cutting edge on said face cutting edge;

said corner cutting edge, with reference to the direction of the longitudinal axis of said end milling cutter, is the part of said milling head that is axially the farthest from said shaft;

said peripheral cutting edge encloses an angle of twist of at least 10° with the longitudinal axis of said end milling cutter;

said milling head has a peripheral step, adjacent to which in the direction toward said shaft is a tapered area of said milling head;

said peripheral cutting edge is adjacent to said peripheral step;

said shaft is realized with a double wall, with an inner shaft and an outer shaft;

said milling cutter comprises a fluid feed opening located laterally on said outer shaft;

said milling cutter comprises a helical fluid channel between said inner shaft and said outer shaft;

said internal channel configured to receive and guide chips comprises a diameter;

the diameter of said internal channel configured to receive and guide chips is at least 75% of said shaft diameter;

the wall thickness of said outer shaft is a maximum of 10% of said shaft diameter;

the wall thickness of said inner shaft is a maximum of 10% of said shaft diameter; and the wall thickness of said inner shaft is less than the wall thickness of said outer shaft.

7. A method of milling a light metal workpiece with an end milling cutter comprising a central longitudinal axis about which said end milling cutter is to be rotated, said end milling cutter comprising: a rotatable shaft comprising an internal channel disposed in said shaft; said internal channel being configured to receive and guide chips produced during a cutting process; said internal channel being configured to be operatively connected to a suction device configured to create a suction force in said internal channel to suck chips produced during a cutting process through said internal channel; a milling head being disposed at an end of said shaft and being connected to said shaft to be driven and rotated by said shaft in a cutting operation, wherein said rotatable shaft comprises an inner diameter, said milling head comprises an outer diameter, and the inner diameter of said rotatable shaft is smaller than the outer diameter of said milling head, at least in an area that borders said milling head; and said milling head comprising: an end face being disposed at an end of said end milling cutter and facing away from said shaft; said end face being substantially orthogonal to the longitudinal axis; said end face comprising a solid portion being substantially flat; a peripheral side surface disposed about the perimeter of said milling head; a cutting structure being configured to cut an object in a cutting process; said cutting structure configured to cut in a rotational cutting direction; and said cutting structure comprising: a face cutting edge being disposed to lie in said end face of said milling head; a peripheral cutting edge being disposed to lie in said peripheral side surface of said milling head; at least one of said cutting edges being configured to form a positive rake angle; upon said face cutting edge forming a positive rake angle, said face cutting edge being configured as follows: (a) said face cutting edge having a first portion and a second portion; said first portion of said face cutting edge disposed adjacent said peripheral side surface; said second portion of said face cutting edge disposed away from said peripheral side surface; said first portion of said face cutting edge being configured to be rotationally ahead of, in the rotational cutting direction, to precede rotationally, said second portion of said face cutting edge during use; upon said peripheral cutting edge forming a positive rake angle, said peripheral cutting edge being configured as follows: (b) said peripheral cutting edge having a first portion and a second portion; said first portion of said peripheral cutting edge disposed adjacent said end face; said second portion of said peripheral cutting edge disposed away from said end face; and said first portion of said peripheral cutting edge being configured to be rotationally ahead of, to precede rotationally, said second portion of said peripheral cutting edge during use; said method comprising the steps of: rotating said rotatable shaft and driving and rotating said milling head; creating a suction force in said internal channel using a suction device operatively connected to said internal channel; bringing said milling head into contact with the light metal workpiece; cutting the light metal workpiece with said cutting edges of said end milling cutter and producing light metal chips; and sucking the light metal chips into and through said internal channel in said shaft and conducting the light metal chips away from the light metal workpiece.

8. The method according to claim 7, wherein at least one of the rake angle of said face cutting edge and the rake angle of said peripheral cutting edge is at least 10°.

9. The method according to claim 8, wherein both the rake angle of said face cutting edge and the rake angle of said peripheral cutting edge are configured to form positive rake angles.

10. The method according to claim 9, wherein said milling cutter comprises at least one of (a) and (b) (a) said milling head is formed in one piece from a cutting material; said milling head has an aperture surface for the removal of chips into said internal channel configured to receive and guide chips, which comprises at least 35% of the cross section surface of the outer diameter of said shaft; and said step of sucking light metal chips into and through said internal channel in said shaft comprises sucking light metal chips through said aperture surface and into said internal channel; (b) the height of said milling head is a maximum of 50% of the diameter of said milling head; said milling head is realized with at least three lobes; and said face cutting edge extends from one edge of said milling head to beyond the longitudinal axis of said end milling cutter.

11. The method according to claim 10, wherein said milling cutter comprises at least one of (a) through (h), as follows:
  (a) said peripheral cutting edge is adjacent to a corner cutting edge on said face cutting edge;
    said corner cutting edge, with reference to the direction of the longitudinal axis of said end milling cutter, is the part of said milling head that is axially the farthest from said shaft; and
    said peripheral cutting edge encloses an angle of twist of at least 10° with the longitudinal axis of said end milling cutter;
  (b) said milling head has a peripheral step, adjacent to which in the direction toward said shaft is a tapered area of said milling head;
    said peripheral cutting edge is adjacent to said peripheral step; and
    said shaft is realized with a double wall, with an inner shaft and an outer shaft;
  (c) said shaft is realized with a double wall, with an inner shaft and an outer shaft;
    said milling cutter comprises a fluid feed opening located laterally on said outer shaft;
  (d) said shaft is realized with a double wall, with an inner shaft and an outer shaft;
    said milling cutter comprises a helical fluid channel between said inner shaft and said outer shaft;
  (e) said internal channel configured to receive and guide chips comprises a the diameter;
    the diameter of said internal channel configured to receive and guide chips is at least 75% of said shaft diameter;
  (f) said shaft is realized with a double wall, with an inner shaft and an outer shaft;
    the wall thickness of said outer shaft is a maximum of 10% of said shaft diameter;
  (g) said shaft is realized with a double wall, with an inner shaft and an outer shaft;
    the wall thickness of said inner shaft is a maximum of 10% of said shaft diameter; and
  (h) said shaft is realized with a double wall, with an inner shaft and an outer shaft;
    the wall thickness of said inner shaft is less than the wall thickness of said outer shaft.

12. The method according to claim 11, wherein:
  said peripheral cutting edge is adjacent to a corner cutting edge on said face cutting edge;
  said corner cutting edge, with reference to the direction of the longitudinal axis of said end milling cutter, is the part of said milling head that is axially the farthest from said shaft;
  said peripheral cutting edge encloses an angle of twist of at least 10° with the longitudinal axis of said end milling cutter;
  said milling head has a peripheral step, adjacent to which in the direction toward said shaft is a tapered area of said milling head;
  said peripheral cutting edge is adjacent to said peripheral step;
  said shaft is realized with a double wall, with an inner shaft and an outer shaft;
  said milling cutter comprises a fluid feed opening located laterally on said outer shaft;
  said milling cutter comprises a helical fluid channel between said inner shaft and said outer shaft;
  said internal channel configured to receive and guide chips comprises a diameter;
  the diameter of said internal channel configured to receive and guide chips is at least 75% of said shaft diameter;
  the wall thickness of said outer shaft is a maximum of 10% of said shaft diameter;
  the wall thickness of said inner shaft is a maximum of 10% of said shaft diameter; and
  the wall thickness of said inner shaft is less than the wall thickness of said outer shaft.

13. A method of milling a workpiece with a milling cutter comprising a central longitudinal axis about which said milling cutter is to be rotated, said milling cutter comprising: a rotatable shaft comprising an internal channel disposed in said shaft; said internal channel being configured to receive and guide chips produced during a cutting process; said internal channel being configured to be operatively connected to a suction device being configured to create a suction force in said internal channel to suck chips produced during a cutting process through said internal channel; a milling head being disposed at an end of said shaft and being connected to said shaft to be driven and rotated by said shaft in a cutting operation, wherein said rotatable shaft comprises an inner diameter, said milling head comprises an outer diameter, and the inner diameter of said rotatable shaft is smaller than the outer diameter of said milling head, at least in an area that borders said milling head; and said milling head comprising: an end surface being disposed at an end of said milling cutter and disposed away from said shaft; said end surface being substantially transverse to the longitudinal axis; said end surface comprising a solid portion; a peripheral side surface being disposed about the perimeter of said milling head; a cutting structure being configured to cut an object in a cutting process; and said cutting structure comprising: an end cutting edge being disposed to lie in said end surface; and a peripheral cutting edge being disposed to lie in said peripheral side surface of said milling head; said method comprising the steps of: rotating said rotatable shaft and driving and rotating said milling head; creating a suction force in said internal channel using a suction device operatively connected to said internal channel; bringing said milling head into contact with the workpiece; cutting the workpiece with said cutting edges of said end milling cutter and producing chips; and sucking the chips into and through said internal channel in said shaft and conducting the chips away from the workpiece.

14. The method according to claim 13, wherein:
  at least one of said cutting edges is configured to form a positive rake angle;
  upon said end cutting edge forming a positive rake angle, said end cutting edge being configured as follows:
    (a) said end cutting edge and said peripheral side surface forming an angle, across a solid portion of said end surface between said end cutting edge and said peripheral side surface;
      said end cutting edge angle comprising an acute angle;
      said end cutting edge acute angle being configured to dispose said end cutting edge at a positive rake angle; and
  upon said peripheral cutting edge forming a positive rake angle said peripheral cutting edge being configured as follows:
    (b) said peripheral cutting edge and said end surface forming an angle, across a solid portion of said peripheral side surface between said peripheral cutting edge and said end surface;
      said peripheral cutting edge angle comprising an acute angle to form a positive rake angle; and
      said peripheral cutting edge acute angle being configured to dispose said peripheral cutting edge at a positive rake angle.

15. The method according to claim 14, wherein:
said end surface comprises an end face disposed to face away from said shaft;
said solid portion of said end face is disposed to lie substantially in a plane;
said end cutting edge comprises a face cutting edge disposed to lie substantially in the plane of said end face;
at least one of the rake angle of said face cutting edge and the rake angle of said peripheral cutting edge is at least 10°.

16. The method according to claim 15, wherein: said milling head is formed in one piece from a cutting material; said milling head has an aperture surface for the removal of chips into said internal channel configured to receive and guide chips, which amounts to at least 35% of the cross section surface of said shaft; and said step of sucking chips into and through said internal channel in said shaft comprises sucking chips through said aperture surface and into said internal channel.

17. The method according to claim 16, wherein:
the height of said milling head is a maximum of 50% of the diameter of said milling head;
said milling head is realized with at least three lobes; and
said face cutting edge extends from one edge of said milling head to beyond the longitudinal axis of said milling cutter.

18. The method according to claim 17, wherein both the rake angle of said face cutting edge and the rake angle of said peripheral cutting edge are configured to form positive rake angles.

19. The method according to claim 18, wherein said milling cutter comprises at least one of (a) through (h), as follows:
(a) said peripheral cutting edge is adjacent to a corner cutting edge on said face cutting edge;
said corner cutting edge, with reference to the direction of the longitudinal axis of said milling cutter, is the part of said milling head that is axially the farthest from said shaft; and
said peripheral cutting edge encloses an angle of twist of at least 10° with the longitudinal axis of said milling cutter;
(b) said milling head has a peripheral step, adjacent to which in the direction toward said shaft is a tapered area of said milling head;
said peripheral cutting edge is adjacent to said peripheral step;
said shaft is realized with a double wall, with an inner shaft and an outer shaft;
(c) said shaft is realized with a double wall, with an inner shaft and an outer shaft;
said milling cutter comprises a fluid feed opening located laterally on said outer shaft;
(d) said shaft is realized with a double wall, with an inner shaft and an outer shaft;
said milling cutter comprises a helical fluid channel between said inner shaft and said outer shaft;
(e) said internal channel configured to receive and guide chips comprises a diameter;
the diameter of said internal channel configured to receive and guide chips is at least 75% of said shaft diameter;
(f) said shaft is realized with a double wall, with an inner shaft and an outer shaft;
the wall thickness of said outer shaft is a maximum of 10% of said shaft diameter;
(g) said shaft is realized with a double wall, with an inner shaft and an outer shaft;
the wall thickness of said inner shaft is a maximum of 10% of said shaft diameter;
(h) said shaft is realized with a double wall, with an inner shaft and an outer shaft;
the wall thickness of said inner shaft is less than the wall thickness of said outer shaft; and
(i) both the rake angle of said face cutting edge and the rake angle of said peripheral cutting edge are greater than 10°.

20. The method according to claim 19, wherein:
said peripheral cutting edge is adjacent to a corner cutting edge on said face cutting edge;
said corner cutting edge, with reference to the direction of the longitudinal axis of said milling cutter, is the part of said milling head that is axially the farthest from said shaft;
said peripheral cutting edge encloses an angle of twist of at least 10° with the longitudinal axis of said milling cutter;
said milling head has a peripheral step, adjacent to which in the direction toward said shaft is a tapered area of said milling head;
said peripheral cutting edge is adjacent to said peripheral step;
said shaft is realized with a double wall, with an inner shaft and an outer shaft;
said milling cutter comprises a fluid feed opening located laterally on said outer shaft;
said milling cutter comprises a helical fluid channel between said inner shaft and said outer shaft;
said internal channel configured to receive and guide chips comprises a diameter;
the diameter of said internal channel configured to receive and guide chips is at least 75% of said shaft diameter;
the wall thickness of said outer shaft is a maximum of 10% of said shaft diameter;
the wall thickness of said inner shaft is a maximum of 10% of said shaft diameter;
the wall thickness of said inner shaft is less than the wall thickness of said outer shaft; and
both the rake angle of said face cutting edge and the rake angle of said peripheral cutting edge are over 10°.

* * * * *